(12) United States Patent
Meier et al.

(10) Patent No.: US 11,763,112 B2
(45) Date of Patent: Sep. 19, 2023

(54) HYBRID SYSTEM AND METHOD FOR READING INDICIA

(71) Applicant: Hand Held Products, Inc., Fort Mill, SC (US)

(72) Inventors: Timothy Meier, Camillus, NY (US); Ryan C. Belanger, Oneida, NY (US); Benjamin Hejl, Cherry Hill, NJ (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 444 days.

(21) Appl. No.: 16/353,192

(22) Filed: Mar. 14, 2019

(65) Prior Publication Data
US 2019/0213370 A1  Jul. 11, 2019

Related U.S. Application Data

(63) Continuation of application No. 14/065,768, filed on Oct. 29, 2013, now Pat. No. 10,275,624.

(51) Int. Cl.
*G06K 7/10* (2006.01)
*G06K 7/14* (2006.01)
*G06F 15/16* (2006.01)

(52) U.S. Cl.
CPC ......... *G06K 7/10722* (2013.01); *G06F 15/16* (2013.01); *G06K 7/10851* (2013.01); *G06K 7/1404* (2013.01); *G06K 7/1413* (2013.01); *G06K 7/1417* (2013.01)

(58) Field of Classification Search
CPC ........... G06K 7/10722; G06K 7/10851; G06K 7/1404; G06K 7/1413; G06K 7/1417; G06K 7/01; G06K 15/16
See application file for complete search history.

(56) References Cited

U.S. PATENT DOCUMENTS

| | | | |
|---|---|---|---|
| 3,668,650 A | 6/1972 | Wang | |
| 4,411,016 A | 10/1983 | Wakeland | |
| 4,542,528 A | 9/1985 | Sanner et al. | |
| 5,081,342 A | 1/1992 | Knowles et al. | |
| 5,194,722 A | 3/1993 | Mergenthaler et al. | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Daniel I Walsh
(74) *Attorney, Agent, or Firm* — Alston & Bird LLP

(57) ABSTRACT

An indicia-reading system is provided that incorporates a hybrid approach to decoding indicia such as barcodes. An indicia-capturing subsystem acquires information about indicia within the indicia-capturing subsystem's field of view. An indicia-decoding module decodes indicia information acquired by the indicia-capturing subsystem. The indicia-decoding module includes a primary, basic signal processor for initially decoding indicia information, and a secondary, advanced signal processor for decoding indicia information that is not decoded by the primary, basic signal processor.

8 Claims, 1 Drawing Sheet

(56) References Cited

U.S. PATENT DOCUMENTS

| | | | |
|---|---|---|---|
| 5,247,161 A | 9/1993 | Actis et al. | |
| 5,378,883 A | 1/1995 | Batterman et al. | |
| 5,481,098 A | 1/1996 | Davis et al. | |
| 5,510,603 A | 4/1996 | Hess et al. | |
| 5,512,739 A * | 4/1996 | Chandler | G06K 7/1093 |
| | | | 235/454 |
| 5,627,358 A * | 5/1997 | Roustaei | G06K 7/1093 |
| | | | 235/462.11 |
| 5,952,644 A | 9/1999 | Barkan | |
| 5,992,750 A * | 11/1999 | Chadima, Jr. | G06K 7/10722 |
| | | | 235/462.45 |
| 6,234,395 B1 | 5/2001 | Chadima et al. | |
| 6,286,760 B1 | 9/2001 | Schmidt et al. | |
| 6,543,691 B1 | 4/2003 | Lemelson et al. | |
| 6,832,725 B2 | 12/2004 | Gardiner et al. | |
| 6,860,427 B1 | 3/2005 | Schmidt et al. | |
| 7,070,108 B1 * | 7/2006 | Blanford | G06K 7/14 |
| | | | 235/462.01 |
| 7,128,266 B2 | 10/2006 | Marlton et al. | |
| 7,159,783 B2 | 1/2007 | Walczyk et al. | |
| 7,311,259 B2 | 12/2007 | Watanabe et al. | |
| 7,380,719 B1 | 6/2008 | Gregerson | |
| 7,413,127 B2 | 8/2008 | Ehrhart et al. | |
| 7,726,575 B2 | 6/2010 | Wang et al. | |
| 7,857,221 B2 | 12/2010 | Kuhno et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,500,027 B2 | 8/2013 | Kishimoto et al. | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,590,792 B2 | 11/2013 | Tan et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,939,363 B2 | 1/2015 | Powell et al. | |
| 10,067,069 B2 | 9/2018 | Pinter | |
| 10,489,625 B1 * | 11/2019 | Handshaw | G06K 7/1491 |
| 10,621,397 B2 * | 4/2020 | Jovanovski | G06K 7/10722 |
| 2001/0042789 A1 | 11/2001 | Krichever et al. | |
| 2002/0063159 A1 | 5/2002 | Wilz et al. | |
| 2002/0148898 A1 | 10/2002 | Gregerson et al. | |
| 2002/0170970 A1 | 11/2002 | Ehrhart | |
| 2002/0190128 A1 | 12/2002 | Levine et al. | |
| 2003/0085284 A1 | 5/2003 | Bremer et al. | |
| 2003/0222144 A1 | 12/2003 | Meier et al. | |
| 2003/0222147 A1 * | 12/2003 | Havens | G06K 7/10722 |
| | | | 235/462.45 |
| 2004/0016797 A1 | 1/2004 | Jones et al. | |
| 2004/0112963 A1 * | 6/2004 | Blanford | G02B 26/122 |
| | | | 235/462.25 |
| 2004/0164163 A1 * | 8/2004 | Watanabe | G06K 7/10702 |
| | | | 235/462.25 |
| 2004/0238629 A1 | 12/2004 | Buchholz | |
| 2004/0240559 A1 | 12/2004 | Prakasam et al. | |
| 2005/0001035 A1 | 1/2005 | Hawley et al. | |
| 2005/0178834 A1 | 8/2005 | Natsuno | |
| 2006/0065734 A1 * | 3/2006 | Sackett | G06K 7/14 |
| | | | 235/462.25 |
| 2006/0076397 A1 | 4/2006 | Geoffrey | |
| 2006/0090161 A1 * | 4/2006 | Bodas | G06F 9/5044 |
| | | | 718/100 |
| 2006/0091219 A1 * | 5/2006 | Joseph | G06K 7/10712 |
| | | | 235/462.25 |
| 2007/0051812 A1 | 3/2007 | Lopez et al. | |
| 2007/0057050 A1 | 3/2007 | Kuhno et al. | |
| 2007/0057064 A1 | 3/2007 | Schneider et al. | |
| 2007/0063048 A1 | 3/2007 | Havens et al. | |
| 2007/0221734 A1 * | 9/2007 | Madej | G06K 7/14 |
| | | | 235/462.16 |
| 2007/0267501 A1 | 11/2007 | Jovanovski et al. | |

(56) References Cited

U.S. PATENT DOCUMENTS

| | | | |
|---|---|---|---|
| 2008/0011855 A1* | 1/2008 | Nadabar | G06K 7/1093 |
| | | | 235/462.07 |
| 2008/0029602 A1* | 2/2008 | Burian | G06K 7/10722 |
| | | | 235/462.09 |
| 2008/0034272 A1 | 2/2008 | Wu et al. | |
| 2008/0121717 A1 | 5/2008 | Gregerson | |
| 2008/0179402 A1 | 7/2008 | Barkan et al. | |
| 2008/0185432 A1 | 8/2008 | Caballero et al. | |
| 2008/0197201 A1 | 8/2008 | Manessis et al. | |
| 2008/0253275 A1 | 10/2008 | Feher | |
| 2008/0296393 A1 | 12/2008 | Jovanovski et al. | |
| 2009/0127343 A1 | 5/2009 | Chiang | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0252635 A1 | 10/2010 | Drzymala et al. | |
| 2011/0062238 A1 | 3/2011 | Good | |
| 2011/0080414 A1* | 4/2011 | Wang | G06K 7/1413 |
| | | | 345/502 |
| 2011/0169999 A1 | 7/2011 | Grunow et al. | |
| 2011/0174881 A1* | 7/2011 | Samek | G06K 7/14 |
| | | | 235/470 |
| 2011/0202554 A1 | 8/2011 | Powilleit et al. | |
| 2011/0211726 A1 | 9/2011 | Moed et al. | |
| 2011/0215146 A1 | 9/2011 | Shams | |
| 2011/0246760 A1 | 10/2011 | Ueta | |
| 2011/0253784 A1 | 10/2011 | Kishimoto et al. | |
| 2011/0264981 A1 | 10/2011 | Alrod et al. | |
| 2012/0111946 A1 | 5/2012 | Golant | |
| 2012/0138685 A1 | 6/2012 | Qu et al. | |
| 2012/0153022 A1* | 6/2012 | Havens | G06K 7/10841 |
| | | | 235/455 |
| 2012/0168511 A1 | 7/2012 | Kotlarsky et al. | |
| 2012/0168512 A1 | 7/2012 | Kotlarsky et al. | |
| 2012/0193407 A1 | 8/2012 | Barten | |
| 2012/0193423 A1 | 8/2012 | Samek | |
| 2012/0193426 A1 | 8/2012 | Gelay | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2012/0256000 A1 | 10/2012 | Cok | |
| 2013/0037605 A1 | 2/2013 | Cok et al. | |
| 2013/0043312 A1 | 2/2013 | Van Horn | |
| 2013/0043314 A1 | 2/2013 | Gillet et al. | |
| 2013/0056285 A1 | 3/2013 | Meagher | |
| 2013/0062412 A1 | 3/2013 | Tan et al. | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0112752 A1* | 5/2013 | Negro | G06K 19/06037 |
| | | | 235/472.01 |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0214048 A1 | 8/2013 | Wilz | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292474 A1 | 11/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedraro | |
| 2013/0306734 A1 | 11/2013 | Xian et al. | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0313326 A1 | 11/2013 | Ehrhart | |
| 2013/0327834 A1 | 12/2013 | Hennick et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0021256 A1 | 1/2014 | Qu et al. | |
| 2014/0025584 A1 | 1/2014 | Liu et al. | |
| 2014/0027518 A1 | 1/2014 | Edmonds et al. | |
| 2014/0034723 A1 | 2/2014 | Van Horn et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061305 A1 | 3/2014 | Nahill et al. | |
| 2014/0061306 A1 | 3/2014 | Wu et al. | |
| 2014/0061307 A1 | 3/2014 | Wang et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0075846 A1 | 3/2014 | Woodburn | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0084068 A1 | 3/2014 | Gillet et al. | |
| 2014/0086348 A1 | 3/2014 | Peake et al. | |
| 2014/0097249 A1 | 4/2014 | Gomez et al. | |
| 2014/0098284 A1 | 4/2014 | Oberpriller et al. | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Kearney | |
| 2014/0121445 A1 | 5/2014 | Ding et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131441 A1 | 5/2014 | Nahill et al. | |
| 2014/0133379 A1 | 5/2014 | Wang et al. | |
| 2014/0140585 A1 | 5/2014 | Wang | |
| 2014/0151453 A1 | 6/2014 | Meier et al. | |
| 2014/0160329 A1 | 6/2014 | Ren et al. | |
| 2014/0263632 A1* | 9/2014 | Powell | G06K 19/06112 |
| | | | 235/383 |
| 2015/0115035 A1* | 4/2015 | Meier | G06F 15/16 |
| | | | 235/462.25 |
| 2015/0161429 A1 | 6/2015 | Xian | |
| 2015/0205984 A1* | 7/2015 | Jiang | G06K 19/06037 |
| | | | 235/437 |
| 2015/0332078 A1 | 11/2015 | Wang | |
| 2015/0379320 A1 | 12/2015 | Slowik et al. | |
| 2016/0012324 A1 | 1/2016 | Eschbach et al. | |
| 2017/0293788 A1* | 10/2017 | Taira | G06K 7/1443 |
| 2021/0158000 A1* | 5/2021 | Fjellstad | G06K 7/1473 |

(56) References Cited

U.S. PATENT DOCUMENTS

OTHER PUBLICATIONS

U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng at al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 13/367,978, filed Feb. 7, 2012, (Feng et al.); now abandoned.
U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System For Providing A Continuous Communication Link With A Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
Search and Exam Report in related Application GB1417501.2, dated Mar. 26, 2015, 4 pages.
Examination Report in related Application GB1417501.2, dated Oct. 7, 2015, 3 pages.
Second Examination Report in counterpart British Application No. GB1417501.2 dated Dec. 9, 2016, pp. 1-3.
Intention to Grant in counterpart British Application No. GB1417501.2, dated Oct. 14, 2016, pp. 1-4.
Second Examination Report in counterpart British Application No. GB1417501.2, dated Dec. 9, 2015, pp. 1-3.
Advisory Action (PTOL-303) dated Jun. 9, 2015 for U.S. Appl. No. 14/065,768.
Advisory Action (PTOL-303) dated Oct. 18, 2016 for U.S. Appl. No. 14/065,768.

(56) References Cited

OTHER PUBLICATIONS

Applicant Initiated Interview Summary (PTOL-413) dated Jan. 16, 2015 for U.S. Appl. No. 14/065,768.
Final Rejection dated Aug. 16, 2016 for U.S. Appl. No. 14/065,768.
Final Rejection dated Feb. 9, 2015 for U.S. Appl. No. 14/065,768.
Final Rejection dated Oct. 4, 2018 for U.S. Appl. No. 14/065,768.
Non-Final Rejection dated Apr. 25, 2016 for U.S. Appl. No. 14/065,768.
Non-Final Rejection dated Jul. 18, 2014 for U.S. Appl. No. 14/065,768.
Non-Final Rejection dated Mar. 2, 2017 for U.S. Appl. No. 14/065,768.
Non-Final Rejection dated May 30, 2018 for U.S. Appl. No. 14/065,768.
Notice of Allowance and Fees Due (PTOL-85) dated Dec. 14, 2018 for U.S. Appl. No. 14/065,768.

* cited by examiner

HYBRID SYSTEM AND METHOD FOR READING INDICIA

CROSS-REFERENCE TO PRIORITY APPLICATION

This application is a continuation of commonly assigned U.S. application Ser. No. 14/065,768 for a HYBRID SYSTEM AND METHOD FOR READING INDICIA, filed Oct. 29, 2013, the entire disclosure of which is incorporated herein by reference.

FIELD OF THE INVENTION

The present invention relates to indicia readers, such as barcode readers. More specifically, the present invention relates to a hybrid system and method for reading indicia employing programmable-logic signal processing or software signal processing, or both.

BACKGROUND

Indicia readers, such as barcode scanners, are typically configured to acquire information from indicia and then decode that information for use in data systems. Advanced signal processing techniques beneficially aid in the decoding of indicia in circumstances where the signal representing the indicia information is outside of the nominal range. For example, reading indicia positioned at a greater distance from the indicia reader tends to increase signal interference and decrease signal strength. In such instances, greater processing power is typically needed to successfully decode insignia information. Although the advanced signal processing techniques, such as advanced computer software algorithms, often achieve improved decoding results, they can unnecessarily complicate and delay processing of signals acquired under more mundane circumstances.

Therefore, a need exists for an insignia reader capable of decoding more complex indicia information signals without sacrificing performance in decoding less complex signals.

SUMMARY

Accordingly, in one aspect, the present invention embraces a system for reading indicia, such as barcodes. The indicia-reading system includes an indicia-capturing subsystem for acquiring information about indicia within the indicia-capturing subsystem's field of view. The indicia-reading system also includes an indicia-decoding module. The indicia-decoding module is configured for decoding indicia information acquired by the indicia-capturing subsystem. The indicia-decoding module includes a primary, basic signal processor for initially decoding indicia information. The indicia-decoding module also includes a secondary, advanced signal processor for decoding indicia information that is not decoded by the primary signal processor.

In one exemplary embodiment, the indicia-capturing subsystem is configured to acquire information about barcode symbols within the indicia-capturing subsystem's field of view.

In another exemplary embodiment, the indicia-capturing subsystem is an imaging subsystem for capturing images within the imaging subsystem's field of view.

In yet another exemplary embodiment, the indicia-capturing subsystem is a laser scanning subsystem for scanning indicia within the laser scanning subsystem's field of view.

In yet another exemplary embodiment, the primary, basic signal processor includes a programmable controller.

In yet another exemplary embodiment, the secondary, advanced signal processor includes a computer processor in communication with an associated memory.

In yet another exemplary embodiment, the secondary, advanced signal processor includes a computer processor in communication with an associated memory, wherein the memory stores software configured to decode indicia information.

In another aspect, the present invention embraces a method for reading indicia. Information about indicia is acquired, and then the indicia information is decoded by (i) attempting to decode the indicia information via a primary, basic signal processor, and (ii) if the primary, basic signal processor cannot decode the indicia information, then the indicia information is decoded via a secondary, advanced signal processor.

In another aspect, the present invention embraces an indicia-reading method in which information about indicia is acquired. The indicia information is decoded by attempting to decode the indicia information via a primary, basic signal processor while substantially simultaneously attempting to decode the indicia information via a secondary, advanced signal processor. The substantially simultaneous decoding attempts continue until the indicia information is successfully decoded.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a system for reading indicia. The term indicia is intended to refer broadly to various types of machine-readable indicia, including barcodes, QR codes, matrix codes, 1D codes, 2D codes, RFID tags, characters, etc. The indicia are typically graphical representations of information (e.g., data) such as product numbers, package tracking numbers, or personnel identification numbers. The use of indicia readers to input data into a system, rather than manual data entry, results in generally faster and more reliable data entry. The indicia-reading system may embrace various kinds of devices used to read indicia, such as handheld barcode scanners, fixed-position omni-directional barcode scanners, pen-type readers, laser scanners, CCD readers, imaging scanners, and mobile devices like smartphones that are equipped to read indicia, and similar devices. The indicia-reading system according to the present invention embraces a hybrid approach to decoding indicia. An initial attempt(s) is made to decode the indicia using less sophisticated, but faster, decoding technology. If the initial attempt(s) is unsuccessful, the system employs more sophisticated technology to decode the indicia.

Figure 1:
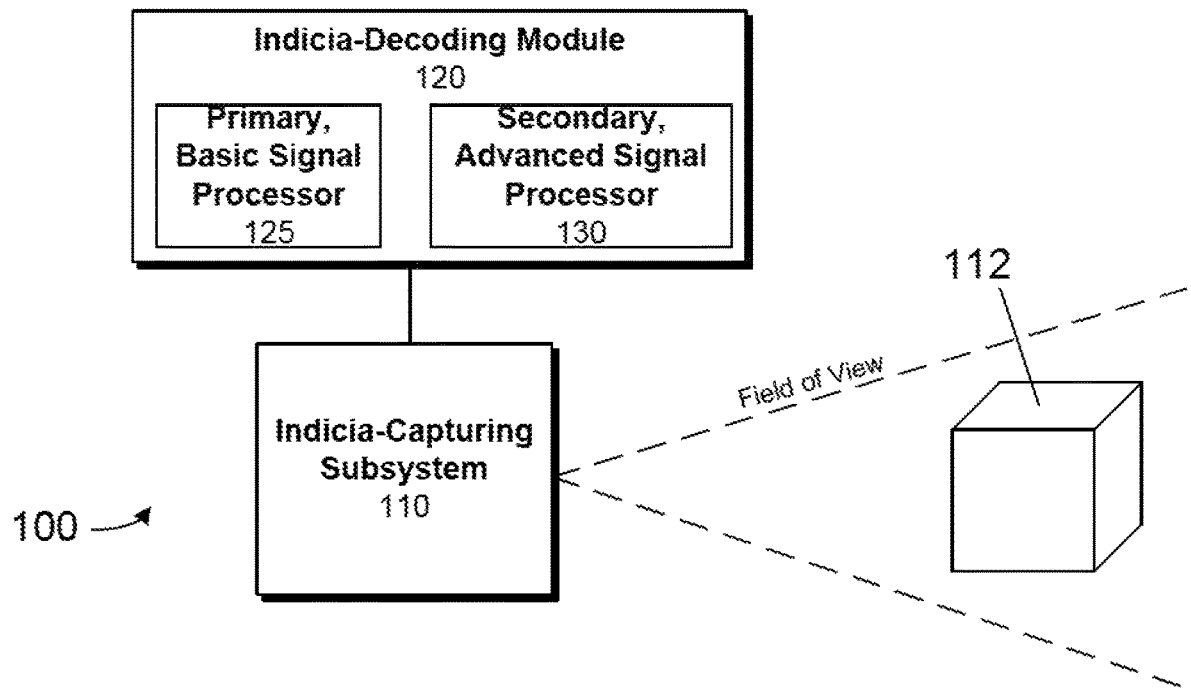
FIG. 1 is a block diagram illustrating an exemplary indicia-reading system according to the present invention.

FIG. 1 illustrates an exemplary indicia-reading system 100, which includes an indicia-capturing subsystem 110. The indicia-capturing subsystem 110 acquires information about indicia within the indicia-capturing subsystem's 110 field of view. Typically, an object 112 that bears one or more indicia is placed within the field of view of the indicia-capturing subsystem 110. Alternatively, the indicia-capturing subsystem 110 is manipulated to reposition the field of view to include the object 112 bearing the indicia.

In some instances, the indicia-capturing subsystem 110 is a laser scanning subsystem that sweeps a light beam (e.g., a laser beam) across the field of view, and then receives the optical signals that reflect or scatter off the indicia. Typically, the optical signal is received using a photoreceptor (e.g., photodiode), and is converted into an electrical signal. The electrical signal is an electronic representation of the indicia information (e.g., the data represented by the indicia). When in the form of an electrical signal, this information can be processed (e.g., decoded) by the system 100.

In other instances, the indicia-capturing subsystem 110 is an imaging subsystem. The imaging subsystem captures digital images of objects 112 within the subsystem's field of view. When the indicia information takes the form of a digital image, the indicia information is typically processed through the use of image-processing software (e.g. 1D bar code, 2D bar code, postal code, and/or optical character recognition (OCR) decoding technology), which can both identify the presence of indicia in the digital image and decode the indicia. Therefore, references herein to electrical signals are intended broadly to also encompass digital images capable of being processed electronically (e.g., via an image-processing computer processor).

The indicia-reading system 100 according to the present invention may also include an indicia-decoding module 120. The indicia-decoding module 120 is configured to decode indicia information (e.g., electrical signal or digital image) acquired by the indicia-capturing subsystem 110. The indicia-decoding module includes a primary, basic signal processor 125. The primary, basic signal processor 125 is employed to make an initial attempt(s) at decoding the indicia information. Typically, the primary, basic signal processor 125 is configured to process the indicia information quickly. Typically, the primary, basic signal processor 125 is a programmable controller (e.g., programmable logic controller). Although a programmable controller may have limited signal-processing capabilities compared with more complex systems, a programmable controller's fast response time makes it suitable for this initial decoding attempt. In addition, because the system 100 does not rely on the primary, basic signal processor 125 to implement complex signal-processing methods, the configuration of the primary, basic signal processor 125 is relatively simple and less costly to manufacture.

Typically, the primary, basic signal processor 125 (e.g., programmable controller) is configured to process indicia information that is relatively simple to interpret. In other words, the primary, basic signal processor 125 handles general, fairly benign signal processing. For example, in the case of a system 100 incorporating a laser-scanning subsystem, the programmable controller would be responsible for providing general signal processing by generating edge lists for immediate decoding.

Although the primary, basic signal processor 125 is typically sufficient to decode the indicia information in about 70 percent to 80 percent of the system's 100 operating range, the remaining 20 percent to 30 percent of use cases require more complex signal processing. For example, when an indicia reader is attempting to read indicia positioned relatively far from the indicia-capturing subsystem 110, the optical signal can be compromised (e.g., through signal interference, signal loss), thereby increasing the difficulty in decoding the acquired indicia information. Similarly, when an indicia reader is attempting to read indicia positioned relatively near the indicia-capturing subsystem 110, the optical signal may be much more intense (e.g., powerful) than is typically encountered, thereby requiring additional, more complex processing to decode. Consequently, there are typically certain instances (e.g., edge cases, corner cases) where the signal-decoding performance of the primary, basic signal processor 125 is insufficient to successfully decode indicia information.

To handle indicia information that cannot be successfully decoded by the primary, basic signal processor 125, the system 100 according to the present invention typically incorporates a secondary, advanced signal processor 130. Typically, the secondary, advanced signal processor 130 is capable of executing more advanced signal-processing algorithms than the primary, basic signal processor 125 is capable of performing. Typically, the secondary, advanced signal processor 130 includes a computer processor in communication (e.g., electronic communication) with an associated memory (e.g., non-volatile computer-readable memory). More typically, the secondary, advanced signal processor 130 includes a computer processor in communication with an associated memory, wherein the memory stores software configured to decode indicia information (e.g., signal-processing software). The computer processor is configured to execute the instructions of the signal-processing software. It will be appreciated by a person of ordinary skill in the art that the incorporation of signal-processing software advantageously allows for relatively quick development, and for the designing of complex signal processing algorithms. Moreover, signal-processing software typically can be readily modified to achieve improved signal-processing results, and such modifications can often be implemented in the field (e.g., through system updates). The increased decoding power and flexibility offered by the secondary, advanced signal processor 130, however, typically comes at the cost of increased processing time. The advanced algorithms employed by the secondary, advanced signal processor 130 typically require complex calculations and data manipulation that require much more time to execute than do the functions of the typical primary, basic signal processor 125 (e.g., programmable controller). The user experiences this increased processing time as a lag between the time the user initiates a scan (e.g., by triggering the device) and the time that the indicia is decoded.

Because the secondary, advanced signal processor 130 typically takes longer to process indicia information than does the primary, basic signal processor, greater usability can be achieved by employing the system's hybrid approach to decoding indicia information. More particularly, the system 100 according to the present invention is usually configured to first attempt to decode indicia information using the primary, basic signal processor 125. Depending on the specific configuration of the system 100, which may be set at the factory and/or be adjusted by the user, the primary, basic signal processor 125 may make one or more attempts at decoding the indicia information. If the primary, basic signal processor 125 is unable to decode the indicia information, then the secondary, advanced signal processor 130 attempts to decode the indicia information. When the indicia information (e.g., electrical signal) is passed to the secondary, advanced signal processor 130, it may be in its original form, or it may be pre-processed by the primary, basic signal processor 125 into a form that can be more readily decoded by the secondary, advanced signal processor 130.

Alternatively, indicia information may be received by both the primary, basic signal processor 125 and the secondary, advanced signal processor 130 substantially simultaneously so that the primary, basic signal processor 125 and the secondary, advanced signal processor 130 may each attempt to decode the indicia information in parallel. It will be appreciated by a person of ordinary skill in the art that "substantially simultaneously" in this context means that the two processing sequences begin and/or end less than several milliseconds from each other. In this parallel arrangement, if the primary, basic signal processor 125 is able to decode the indicia information before the secondary, advanced signal processor 130 can decode the indicia information, the secondary, advanced signal processor 130 interrupts its processing to await receipt of the next indicia information. For example, the primary, basic signal processor 125 may send an instruction (e.g., an interrupt) to the secondary, advanced signal processor 125 directing it to cease attempting to decode the current indicia information. Conversely, if the secondary, advanced signal processor 130 successfully decodes the indicia information before the primary, basic signal processor 125 completes the decoding process, then the primary, basic signal processor 125 interrupts its decoding process and awaits receipt of the next indicia information for decoding. It will be appreciated by a person of ordinary skill in the art that both the primary, basic signal processor 125 and the secondary, advanced signal processor 130 may be software-based or hardware-based signal processors.

In an exemplary embodiment, the system 100 may be configured to initiate processing of indicia information by the secondary, advanced signal processor 130 only when a certain precondition(s) is satisfied. For example, the system 100 may be configured to utilize the secondary, advanced signal processor 130 only when a certain number of scans (e.g., laser sweeps, image processing attempts) have been performed (e.g., three scans). In this example, the system 100 makes three attempts to acquire indicia information and decode the indicia information. These initial three attempts are made by the primary, basic signal processor 125. If any one of these first three scans results in a successful decoding of the indicia information, the signal processing ceases, the results of the decoding are reported, and the system 100 resets and awaits the initiation of a subsequent decoding request (e.g., by the user activating a trigger). If, however, the first three scans do not result in a successful decoding of the indicia information, the system 100 switches over the signal-processing duties to the secondary, advanced signal processor 130. For all subsequent scans, the secondary, advanced signal processor 130 will continue to attempt to decode the indicia information until it reaches a predefined scan limit, whereupon it will report a scan failure. In this way, the indicia-decoding module 120 seeks first to decode indicia information using the faster primary, basic signal processor 125. In the majority (e.g., 70 percent to 80 percent) of operating scenarios, this approach will result in faster decoding because there is no time wasted on unnecessarily complicated signal-processing algorithms that are only needed in unusual circumstances (e.g., edge cases, corner cases). In those operating scenarios requiring greater signal processing capabilities to achieve successful decoding of indicia information, the system 100 retains the capability of calling upon the more sophisticated secondary, advanced signal processor 130 when needed. The result is a system 100 having indicia-decoding properties at least as great as similar readers, but featuring improved response time under most operating conditions.

Figure 2:
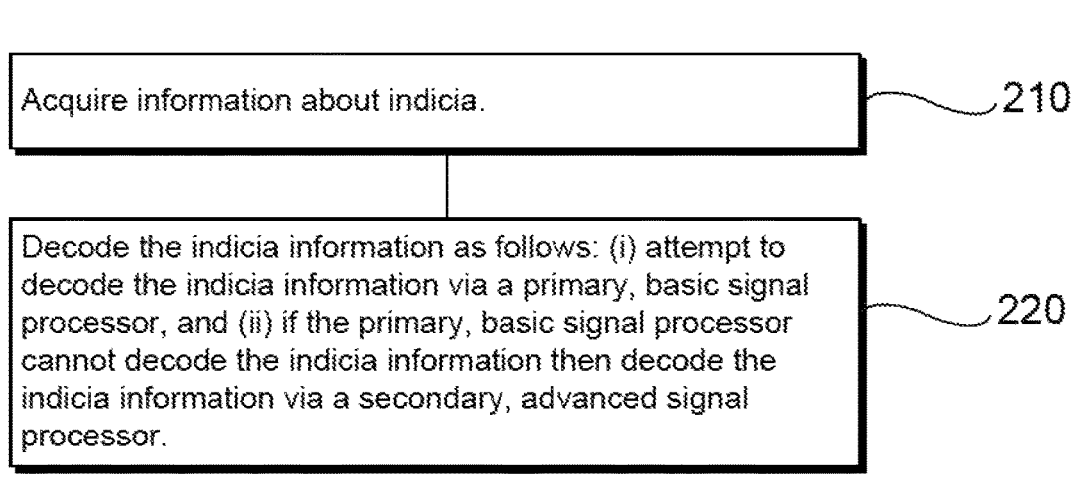
FIG. 2 is a flow chart illustrating an exemplary indicia-reading method according to the present invention.

Referring now to FIG. 2, in another aspect, the invention embraces an indicia-reading method 200. Indicia information is acquired 210. Typically, indicia information will include electrical signals converted from optical signals, or it will include a digital image of an object bearing indicia. Typically, indicia information is acquired by an indicia-capturing subsystem (e.g., imaging subsystem, laser scanning subsystem). The acquired indicia information is decoded (e.g., read) by attempting to decode the indicia information via a primary, basic signal processor. If the primary, basic signal processor cannot decode the indicia (e.g., within a predetermined number of scan attempts), then the acquired indicia information is decoded via a secondary, advanced signal processor 220.

To supplement the present disclosure, this application incorporates entirely by reference the following patents, patent application publications, and patent applications: U.S. Pat. Nos. 6,832,725; 7,159,783; 7,128,266; 7,413,127; 7,726,575; 8,390,909; 8,294,969; 8,408,469; 8,408,468; 8,381,979; 8,408,464; 8,317,105; 8,366,005; 8,424,768; 8,322,622; 8,371,507; 8,376,233; 8,457,013; 8,448,863; 8,459,557; 8,469,272; 8,474,712; 8,479,992; 8,490,877; 8,517,271; 8,556,176 8,561,905; 8,523,076; 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An indicia-reading method, comprising:
acquiring information about an indicia; and
decoding the acquired indicia information, the decoding comprising:
attempting, by a primary, basic signal processor, initial processing of the indicia information;
generating, by the primary, basic signal processor, pre-processed indicia information from the indicia information, based on the initial processing by the primary, basic signal processor being unsuccessful;
sending the pre-processed indicia information from the primary, basic signal processor to a secondary, advanced signal processor, wherein the pre-processed indicia information is in a form readily decodable by the secondary, advanced signal processor; and
processing, by the secondary, advanced signal processor, the received pre-processed indicia information for decoding, based on the initial processing by the primary, basic signal processor being unsuccessful,
wherein the secondary, advanced signal processor is configured for executing a more complex signal-processing algorithm than the primary, basic signal processor.

2. The method of claim 1, wherein the secondary, advanced signal processor is configured for decoding indicia information that cannot be decoded by the primary, basic signal processor due to anomalies in the indicia information caused by signal interference and/or signal strength.

3. The method of claim 1, wherein the indicia information is acquired by an indicia-capturing subsystem.

4. The method of claim 3, wherein the indicia-capturing subsystem comprises an imaging subsystem for capturing images within the imaging subsystem's field of view.

5. The method of claim 3, wherein the indicia-capturing subsystem comprises a laser scanning subsystem for scanning indicia within the laser scanning subsystem's field of view.

6. The method according to claim 1, wherein the primary, basic signal processor comprises a programmable controller.

7. The method according to claim 1, wherein the secondary, advanced signal processor comprises a computer processor in communication with an associated memory.

8. The system according to claim 7, wherein the memory stores software configured to decode the indicia information.

\* \* \* \* \*